(12) United States Patent
Fogel et al.

(10) Patent No.: US 11,225,591 B2
(45) Date of Patent: Jan. 18, 2022

(54) METHOD FOR PRODUCING A SINGLE-SIDED ADHESIVE FILM AND SINGLE-SIDED ADHESIVE FILM

(71) Applicants: Lohmann GmbH & Co. KG, Neuwied (DE); LOGIS AG, Heldenstein (DE); LOGIS TECHNOLOGIES GMBH, Heldenstein (DE)

(72) Inventors: Thomas Fogel, Oberraden (DE); Christoph Frieb, Eltmann (DE); Martin Haag, Munich (DE)

(73) Assignees: Lohmann GmbH & Co. KG, Neuwied (DE); LOGIS AG, Heldenstein (DE); LOGIS TECHNOLOGIES GMBH, Heldenstein (DE)

(*) Notice: Subject to any disclaimer, the term of this patent is extended or adjusted under 35 U.S.C. 154(b) by 0 days.

(21) Appl. No.: 16/316,969

(22) PCT Filed: Jul. 11, 2017

(86) PCT No.: PCT/EP2017/067463
§ 371 (c)(1),
(2) Date: Feb. 5, 2019

(87) PCT Pub. No.: WO2018/011237
PCT Pub. Date: Jan. 18, 2018

(65) Prior Publication Data
US 2019/0225839 A1    Jul. 25, 2019

(30) Foreign Application Priority Data
Jul. 11, 2016   (DE) .................... 10 2016 112 700.0

(51) Int. Cl.
*C09J 7/29*    (2018.01)
*B05D 1/02*    (2006.01)
(Continued)

(52) U.S. Cl.
CPC ................ *C09J 7/29* (2018.01); *B05D 1/02* (2013.01); *B32B 7/06* (2013.01); *B32B 7/12* (2013.01);
(Continued)

(58) Field of Classification Search
CPC ............................. B05D 1/02; B05D 2350/00
See application file for complete search history.

(56) References Cited

U.S. PATENT DOCUMENTS 4,336,293 A * 6/1982 Eiden .................... B29C 59/046
156/209
4,755,337 A * 7/1988 Takahashi .............. C08J 7/0427
264/134

(Continued)

FOREIGN PATENT DOCUMENTS

DE          3634885 A1     4/1988
DE    20 2005 001 617 U1  4/2005
(Continued)

OTHER PUBLICATIONS

Office Action mailed in German Patent Application No. 10 2016 112 700.0 dated Mar. 21, 2017 (5 pages).
(Continued)

*Primary Examiner* — Kelly M Gambetta
(74) *Attorney, Agent, or Firm* — Bookoff McAndrews, PLLC

(57) ABSTRACT

The invention relates to a method for producing a single-sided adhesive film (1). Said method consists of providing a support layer (2) and coating a first side of the support layer (2) with an adhesive film (3), a lubricant coating (4) is applied to a second side of the support layer (2), the support layer (2) being in the form of a polyester film. Said method is characterised in that the polyester film, prior to bonding to the adhesive layer (3), and the lubricant coating (4) is treated with trichloroacetic acid, sodium persulphate, iron chloride
(Continued)

or copper chloride in order to increase the surface energy of the polyester film. The invention also relates to a one-sided adhesive film (1) produced according to the above-mentioned method.

3 Claims, 1 Drawing Sheet

(51) Int. Cl.
    *C09J 7/35*     (2018.01)
    *C09J 7/38*     (2018.01)
    *C09J 7/32*     (2018.01)
    *B32B 7/06*     (2019.01)
    *B32B 7/12*     (2006.01)
    *B32B 27/08*     (2006.01)
    *B32B 27/36*     (2006.01)
(52) U.S. Cl.
    CPC .............. *B32B 27/08* (2013.01); *B32B 27/36* (2013.01); *C09J 7/32* (2018.01); *C09J 7/35* (2018.01); *C09J 7/38* (2018.01); *C09J 7/383* (2018.01); *C09J 7/385* (2018.01); *B05D 2350/00* (2013.01); *B32B 2250/03* (2013.01); *B32B 2250/04* (2013.01); *B32B 2255/10* (2013.01); *B32B 2255/26* (2013.01); *B32B 2405/00* (2013.01); *C09J 2421/00* (2013.01); *C09J 2433/00* (2013.01); *C09J 2463/006* (2013.01); *C09J 2467/006* (2013.01); *C09J 2475/006* (2013.01); *C09J 2483/00* (2013.01)

(56) References Cited

U.S. PATENT DOCUMENTS

| | | | |
|---|---|---|---|
| 5,491,015 A * | 2/1996 | Reeves | B32B 7/05 428/167 |
| 6,582,789 B1 * | 6/2003 | Sumi | C09J 7/255 428/40.1 |
| 2003/0012945 A1 * | 1/2003 | Runge | C09J 7/255 428/317.1 |
| 2015/0037573 A1 * | 2/2015 | Amano | C09J 133/08 428/354 |

FOREIGN PATENT DOCUMENTS

| | | |
|---|---|---|
| DE | 10 2007 062 447 A1 | 6/2009 |
| EP | 2 290 020 A1 | 3/2011 |
| EP | 2 412 774 A1 | 2/2012 |
| JP | 5351458 B2 | 8/2013 |
| WO | 2008/049464 A1 | 5/2008 |
| WO | 2010/046292 A1 | 4/2010 |

OTHER PUBLICATIONS

International Search Report dated Oct. 23, 2017, in International Application No. PCT/EP2017/067463 (6 pages).

* cited by examiner

METHOD FOR PRODUCING A SINGLE-SIDED ADHESIVE FILM AND SINGLE-SIDED ADHESIVE FILM

CROSS-REFERENCE TO RELATED APPLICATIONS

This application is the U.S. national phase entry under 35 U.S.C. § 371 of International Application No. PCT/EP2017/067463, filed on Jul. 11, 2017, which claims priority under 35 U.S.C. § 119 to German Patent Application No. 10 2016 112 700.0, filed Jul. 11, 2016.

TECHNICAL FIELD

The present invention relates to a method for producing a single-sided adhesive film, comprising providing a backing layer and coating a first side of the backing layer with an adhesive layer. The present invention further relates to a single-sided adhesive film that is produced by the above method.

PRIOR ART

In everyday life there are surfaces known which promote the sliding of articles and which form a connection, in a long-lasting and structurally fixed manner, to the underlying base material, or for which the base material already possesses a slip-promoting surface of this kind, as already mentioned above, in the form of hoppers, chutes, slides, pipes, etc. Here, connected in a structurally fixed manner means that when one attempts to separate the actual base material from the surface applied thereto and which promotes sliding of articles, this separation either does not occur or substantially does not occur at the interfaces of the two surfaces, instead occurring somewhere in the interconnected area.

Systems which promote the sliding of articles are also known from the prior art. Thus, for example, WO 2008/049464 A1 and DE 20 2005 001 617 U1 describe edge protection strips for protecting fire protection panes and/or their edges, where the strips are furnished with a surface which promotes the slip behaviour and is composed of any of a wide variety of different materials such as UHMW-PE, PP, PET, PVC or PMMA.

In a similar way, WO 2010/046292 A1 describes an at least single-sidedly furnished adhesive tape comprising a film carrier as slip adhesive tape particularly for the purpose of fixing plastics to vehicle bodies, where the sliding surface preferably consists of PE-UHMW; however, PE/PTFE, PVDF, PET, POM or PEEK are also stated as possible surface materials.

EP 2412774 A1 shows inter alia an adhesive tape which promotes the sliding capacity of its surface and which can be used as an aid for securing a pressure-sensitive adhesive tape on a surface requiring protection, such as, for example, the painted surface of motor vehicles.

In plant construction in the area of conveying systems, particularly in the conveying of piece goods, the components that come into contact with the material being conveyed are generally exposed to high erosive and abrasive forces. Examples of components which may be affected by this include slides, hoppers, pipes, chutes and tipping troughs, which as a base body, with the conveyed material as opposing body, form a tribosystem. The tribological relationships between base body and opposing body have a considerable influence on parameters such as energy use, material use, production and maintenance.

One means for minimizing the wear between base body and opposing body as much as possible is to increase the slip properties of the bodies. In the case of large components of a plant, such as a slide, for example, it is customary to coat them with a solid lubricant. Possible solid lubricants employed include polymers, which are sprayed or poured onto the components in a production facility provided specifically for that purpose. A base body coated with polymers features enhanced slip properties, thereby making it possible to counteract wear as a result of the opposing body, such as the bulk material, for example. The polymer coating in this case acts like a surface protection layer.

The suitability of polymer-based solid lubricants is attributable to low coefficients of sliding friction of $\mu D<0.1$, a capacity for restoration after major deformations and/or a high erosive and abrasive wear resistance.

All in all, the known slip coating methods prove to be extremely complex and inconvenient. The fact that in plant construction, for example, the components for coating must be transported to a separate production facility represents an extra effort in terms of time and finances. A complicating factor is the deployment of assembly teams who are needed in order to dismantle and construct the plants for the purpose of the coating.

DESCRIPTION OF THE INVENTION

Based on the known prior art, an object of the present invention is to provide a method for producing a single-sided adhesive film for lubricant coating, whereby a simple, flexible and rapid coating of building components is possible.

This object is achieved by means of a method with the features of claim 1. Advantageous embodiments are given in the dependent claims.

Accordingly, a method is provided for producing a single-sided adhesive film that comprises providing a backing layer and coating a first side of the backing layer with an adhesive layer. A slip coating is applied to a second side of the backing layer. The backing layer is provided in the form of a polyester film. According to the invention, prior to bonding to the adhesive layer and the slip coating, the polyester film is treated with trichloroacetic acid, sodium persulfate, iron chloride or copper chloride in order to increase the surface energy of the polyester film.

Single-sided adhesive film means that one side of the film has an adhesive in the form of an adhesive layer.

The term "slip coating" refers to a coating which improves the slip properties of the surface to be coated. This means that a slip-coated surface has a lower friction resistance than an uncoated surface.

As the slip coating is directly applied to a single-sided adhesive film, one obtains a product that has good slip properties and high wear resistance, opening up a wide variety of new possibilities for application. In particular, the adhesive film can easily be processed at the application site. The adhesive film need only be glued to the desired surface, for example the surface of a slide in a piece good transportation installation. In some cases, it is necessary to cut the adhesive film to conform to the geometry of the application area. Accordingly, no special technical means are required to install the single-sided adhesive film in its area of application. This possibility of installing the adhesive film in an economical manner with respect to time and tools allows the film to be applied in the field. This means that the material to be coated need not be transported to a production facility provided specifically for the coating operation, in order for the adhesive film to be applied to the material that is to be coated, such as pipes, slides, chutes, tipping troughs and the like, for example.

The adhesive film enables an improvement in the slip properties and a simultaneous increase in the wear protection. In this context it is possible to employ slip coatings which in the cured state are notable for a smooth, hard and scratch-resistant surface.

The backing layer of the adhesive film serves as a base element and favors both the adhesion of the adhesive to the one side and that of the slip coating to the other side.

By means of the above-described method, one obtains an adhesive film that is ready to process and self-adhesive and can be secured on an application area, such as e.g. a slide of a piece good transportation installation, simply by manually pressing it onto said area. The adhesive is selected such that it can be secured on wood floors, silkscreen plates, aluminum floors, steel floors, and even side walls, for example conducting walls of conveying systems.

The polyester film can be configured to be extremely thin, for example with a thickness of 12 to 75 µm, more particularly 23 to 50 µm, and thus to not substantially contribute to the thickness of the adhesive film. At the same time, the polyester film forms a suitable basis for providing structural cohesion of the components of the adhesive film.

Alternatively, the backing layer can also comprise materials such as polyethylene naphthalate, polyvinyl chloride, polycarbonate, papers, polypropylene webs, PET webs, cellulose- or plastic-based fabrics, laid webs, or films based on di- and triacetate or combinations of the above materials.

The surface of the polyester film is modified by the treatment with trichloroacetic acid, thus modifying the surface properties of the polyester. In this manner, the molecular structure of the surface of the polyester film is modified, thus increasing the surface energy of the polyester film and in turn improving the property of the polyester film of forming long-term bonds. Adhesives, waxes or resins and the like can thus better be permanently anchored to the polyester film.

The trichloroacetic acid treatment can be followed by further surface treatments, such as e.g. matt lacquer treatment or thermostabilizing, in order to prepare the polyester film for specific applications.

As an alternative to trichloroacetic acid treatment, the polyester film can also be treated with sodium persulfate, iron chloride, copper chloride and the like.

In a further preferred embodiment, the slip coating is sprayed onto the second side of the backing layer. In order to produce the slip-coated adhesive film, the slip coating is directly sprayed onto the second side of the backing layer using a spraying machine, thus allowing a slip coating spray layer measuring 1 mm to several cm in thickness to be applied in a single operation. Spray treatment of the slip coating also makes it possible to apply the slip coating to the backing layer in a vertical arrangement, for example an arrangement on the side walls of slides or areas of pipes running vertically spatially or an upside down arrangement, for example the upper inner side of a pipe.

In a further embodiment, the slip coating hardens on the backing layer and is thus fixed to it. After the slip coating has been applied to the backing layer, it reacts within a few seconds, i.e. at most 10 seconds. After only a few minutes, the entire hardening process is already completed to such an extent that the single-sided adhesive film can be further processed and can already be loaded.

The slip coating hardens with virtually no shrinkage and can therefore be applied, depending on requirements, in layer thicknesses of several mm. Moreover, the slip coating is preferably machine-processed.

Because of the rapid hardening, the adhesive film coating can also be applied in a vertical arrangement. This provides additional freedom in designing the production process.

In a further preferred embodiment, a release film is applied to the side of the adhesive facing away from the backing layer. The application of a release film, also referred to as a release liner, contributes to improving handling of the adhesive film. After the release film is peeled off the adhesive film, the adhesive film need only be applied to the application area and is immediately ready for use. The release film facilitates storage and transport of the single-sided adhesive film. For example, the adhesive film can be rolled into a roll and stored and transported accordingly. All relevant known materials can be used as release liner materials, such as papers or plastic films or combinations thereof, optionally coated with a release agent such as e.g. silicone.

The above-mentioned object is also achieved by means of a single-sided adhesive film having the features of claim 5. Advantageous embodiments are given in the dependent claims.

Accordingly, a single-sided adhesive film is provided that is producible by a method according to the above-described embodiments and comprises a backing layer and an adhesive layer, wherein the adhesive layer is arranged on a first side of the backing layer. A slip coating is arranged on a second side of the backing layer. According to the invention, the backing layer is a polyester film, in particular a polyester film treated with trichloroacetic acid, sodium persulfate, iron chloride or copper chloride.

A single-sided adhesive film with this type of structure can be rapidly and easily laid and can be provided in a largely flexible length and width for lubricant coating, or if necessary producing highly wear-resistant surfaces. In the area of conveying systems in plant construction, for example, the single-sided adhesive film allows an improvement in the slip properties of surfaces which come into contact with the piece goods to be conveyed. Here it is possible to save costs via conventional solutions. By lining the surface of the material to be coated, such as pipes, slides, chutes, tipping troughs and the like, for example, with the single-sided adhesive film, it is no longer necessary for the material to be coated to be transported to a production facility designed for the coating operation. As a result, there is no longer any need for deployment of an assembly team which is required to dismantle and/or reconstruct the plant and/or the material to be coated at the site of deployment, before and after the coating operation in the production facility.

As a result of the simple possibility for retrofitting on site, it is also possible, correspondingly, to save on time. This proportion of time is very high, particularly in relation to the alternative, that of transporting the material to be coated to a production facility provided specifically for the coating operation. Furthermore, it is also possible, when retrofitting plants with the single-sided adhesive film, to shut down only part of the plant. In other words, the plant can also be operated when only part of the surfaces to be coated have been coated with the single-sided adhesive film.

The single-sided adhesive film can be cut to size on site, wherein a specific cutting geometry tailored to the application can be selected. For example, it is also possible to arrange the single-sided adhesive film only on selected sites of an application area, such as e.g. a chute, at which there is an increased need or simply a need for improved slip properties and/or protecting against wear. This means that the single-sided adhesive film need not necessarily be arranged over the entire surface of the application area.

The polyester film forms a suitable basis for providing sufficient cohesion of the components of the adhesive film. Moreover, a polyester film with a surface etched using trichloroacetic acid provides modified surface characteristics. The molecular structure at the surface of the polyester film is modified, thus increasing the surface energy of the polyester film and in turn improving the property of the polyester film of forming long-term bonds. Adhesives, waxes or resins and the like can thus better be permanently anchored to the polyester film.

A polyester film provides an optimum basis for coating with a functional chemical compound such as e.g. an adhesive. In a further preferred embodiment, the backing layer has a thickness of 12 to 75 μm, and preferably 23 to 50 μm. These extremely thin layer thicknesses of the polyester film contribute to reducing the overall thickness of the single-sided adhesive film. At the same time, the backing layer is capable of providing sufficiently strong adhesion with respect to both the adhesive layer and the slip coating.

In an improvement, the adhesive layer is a solution based on dispersions or solvent-based or solvent-free pressure-sensitive adhesive, heat- or moisture-activatable systems or hotmelts based on acrylates, rubber, polyurethane, and/or silicone adhesives or blends thereof. The selection of the adhesive material depends on the substrate material to be bonded, and accordingly can vary widely. The adhesive layer can be applied to the entire surface, or for example for cost reasons be applied to a portion of the surface in point-shaped, diamond-shaped or similar geometries.

The adhesive layer is arranged on the backing layer with a weight per unit area of preferably 5 to 300 g/m², particularly preferably 50 to 250 g/m², and most particularly preferably 80 to 200 g/m².

In a further preferred improvement, the slip coating comprises polyurethane. A polyurethane-based coating system can be directly applied in liquid form to the backing layer of the adhesive film. The polyurethane can then harden on the backing layer and become fixed thereto. In order not to impair the layer of adhesive, there is a preference for coating systems which cure at a low temperature and which are suitable for hardening at temperatures of equal to or less than 70° C. One polyurethane-based coating system suitable as a slip coating is, for example, a two-component sealing system which in addition to polyurethane comprises polyaspartic esters. Two-component sealing systems of this kind are notable, inter alia, for the fact that they exhibit very good abrasion resistance. One example of a two-component sealing system of this kind is VIASOL LCT 56691P from VIACOR Polymer GmbH.

Alternatively, a polyurethane film configured according to the application requirements can be structurally bonded to the side of the adhesive film facing away from the adhesive side, for example by means of bonding or sealing.

In a further preferred embodiment, the slip coating comprises an epoxy resin or a polyester resin. Epoxy resins and polyester resins can either be applied in liquid form to the side facing away from the adhesive side of the adhesive film or can be provided in the form of a film like layer. This layer can be bonded to the backing layer, e.g. unrolled onto it.

Epoxy resins and polyester resins belong to the group of the duromers, which are characterized by macromolecules with close spatial crosslinking. Duromers show low formability. It is therefore possible to provide a particularly good slip coating or a wear-resistant coating, for example by means of epoxy resin or polyester resin coating of the single-sided adhesive film.

Compared to other lubricant coatings, a single-sided adhesive film comprising an epoxy resin or polyester resin coating shows significantly higher wear resistance. Like the adhesive coating, the surface on the side opposite the adhesive layer can also be provided over its entire surface with the material provided for the intended application, or for cost reasons or because of a certain degree of conductivity, it can also be provided over a portion of the surface in various geometries, such as e.g. point-shaped or line-shaped geometries.

Accordingly, a single-sided adhesive film of this type is suitable for fields of application such as transportation of piece goods, plant construction conveyor systems, switching technology, slides, hoppers, placement chutes, tipping troughs and pipes in which very good slip properties or a high degree of protection from wear is required. The common practice to date in these fields of application has been to take the goods to be coated to a production site, where they are equipped with a slip or wear-resistant coating. This constitutes a considerable time and cost factor. By means of the above-described single-sided adhesive film, which for example has a wear-resistant coating, it is possible to coat the goods in question on site, i.e. directly at the site of application. This allows time and cost requirements to be reduced.

Moreover, a wear-resistant coating can be used in a much more flexible and targeted manner. For example, the single-sided adhesive film can be used in a tipping trough only at sites for which increased wear is generally to be expected.

Alternatively, materials such as polyethylene, Hostalen or polytetrafluoroethylene can also be used as a slip coating or as wear-resistance of the single-sided adhesive film.

In a further preferred embodiment, the side of the slip coating facing away from the backing layer has a smooth, hard and/or scratch-resistant surface. As a result, the single-sided adhesive film is additionally able to improve the slip properties. Hence, if the base body is being moved along on the opposing body—for example, if bulk material is moving along a slide, it is possible to minimize parameters such as sliding wear, rolling wear, collision wear and/or gorging wear.

In a further preferred embodiment, a release film is arranged on the side of the adhesive facing away from the backing layer. The release film, also referred to as a release liner, on the one hand allows simple storage, as the single-sided adhesive film can be wound up into rolls. On the other hand, the single-sided adhesive film is processable due to the release film. After the release film is peeled off, the single-sided adhesive film can be directly applied to the application site.

In a further preferred improvement, the slip coating has a coefficient of friction of μD<0.1.

The above-described single-sided adhesive film can also be used in the food industry. Various materials are used in the food industry, for example for linings of slip materials that meet special requirements. The single-sided adhesive film can thus be used as a food-resistant self-adhesive coating for slip materials and optionally also meet other requirements, such as e.g. in the case of appropriate compositions requirements for kosher or halal surfaces.

In addition, the backing layer and/or the slip coating can also be configured to have electrically and/or thermally conductive, anti-static, flame-retardant, and/or heat-insulating properties.

BRIEF DESCRIPTION OF THE FIGURES

Preferred further embodiments and aspects of the present invention are explained in further detail in the following description of the figures. The figures show the following.

DETAILED DESCRIPTION OF THE PREFERRED EMBODIMENTS

In the following, preferred examples are described with reference to the figures. Elements that are identical, similar or have the same effect are indicated by the same reference numbers. In order to avoid redundancy, repeated description of these elements is sometimes dispensed with in the following description.

Figure 1:
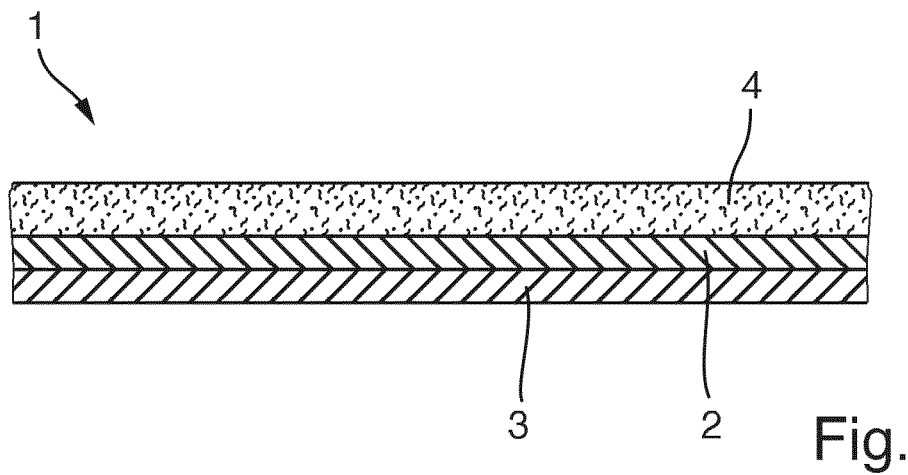
FIG. 1 is a schematic side view of the layer structure of a single-sided adhesive film comprising a layer of a material fulfilling particular properties such as friction reduction or improvement of wear resistance.
Figure 2:
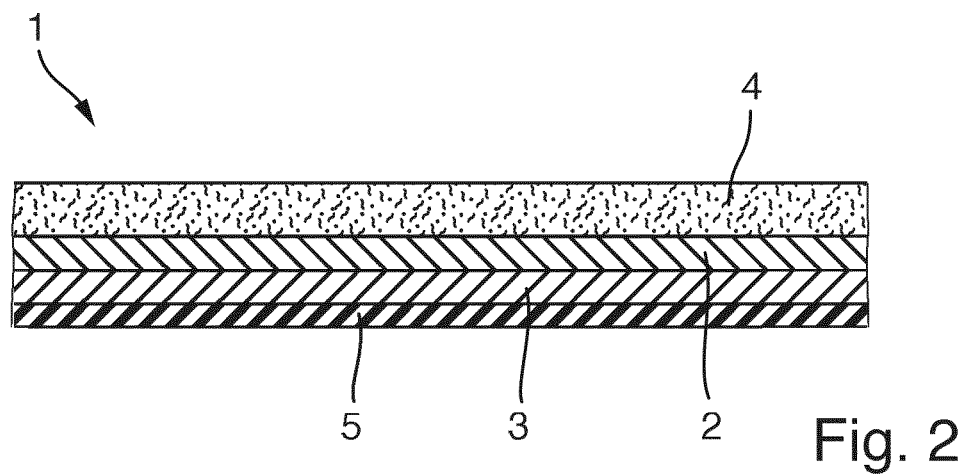
FIG. 2 is a schematic side view of the single-sided adhesive film of FIG. 1 with a release film.

FIGS. 1 and 2 show a single-sided adhesive film that comprises a backing layer 2, an adhesive layer 3 and a slip coating 4 in the form of a plastic spray coating.

The backing layer 2 forms an optimum basis for coating with a functional chemical compound. The backing layer 2 is a polyester film that has been treated with trichloroacetic acid in order to increase its surface energy and improve its adhesion properties. Here, the backing layer 2 is the polyester film Coveme Kemafoil HPH23. The etching treatment of the backing layer 2 with trichloroacetic acid makes it possible to provide ideal adhesion properties of the backing layer 2 with respect to the adhesive layer 3 and the slip coating 4.

As an alternative to trichloroacetic acid treatment, the polyester film can also be treated with sodium persulfate, iron chloride, copper chloride and the like.

Alternatively, the backing layer can also comprise materials such as polyethylene naphthalate, polyvinyl chloride, polycarbonate, papers, polypropylene webs, PET webs, cellulose- or plastic-based fabrics, laid webs, or films based on di- and triacetate or combinations of the above materials.

The adhesive 3 is a dispersion acrylate such as e.g. LK-8203 from Lohmann GmbH & Co. KG. Alternatively, other adhesive systems based on dispersions or solvent-based or solvent-free pressure-sensitive adhesive, heat- or moisture-activatable systems or hotmelts based on acrylates, rubber, polyurethane, and/or silicone adhesives or blends thereof can also be used.

For example, the adhesive layer 3 is suitable for securing the single-sided adhesive film 1 to conveying surfaces of piece good transportation system and the like. Such conveying surfaces generally comprise materials such as e.g. steel, aluminum, wood and/or plastic.

Moreover, the adhesive layer 3 is capable of forming a long-term bond with the etched surface of the backing layer 2.

The adhesive layer is arranged on the backing layer with a weight per unit area of preferably 5 to 300 $g/m^2$, particularly preferably 50 to 250 $g/m^2$, and most particularly preferably 80 to 200 $g/m^2$.

The slip coating 4 is polyurethane-based. In addition to the polyurethane, the slip coating comprises polyaspartic esters. One of the features of this two-component sealing system is very good abrasion resistance. An example of a two-component sealing system of this kind is VIASOL LCT 56691P from VIACOR Polymer GmbH. Furthermore, it is also possible for PTFE (Teflon), polyamides or acetates to be employed as plastic for the slip coating.

In order to produce the single-sided adhesive film, the slip coating 4 is applied to the backing layer 2, for example by means of a spraying machine. The slip spray coating then hardens on the backing layer 2, wherein it undergoes long-term adhesive bonding with the surface of the backing layer 2. Alternatively, the slip coating can also be poured onto the backing layer in the form of a cast plastic layer.

The layer based on the slip coating 4 possesses low friction resistance and/or wear resistant properties. The coefficient of friction μD of the surface of the slip coating is in the range of 0.1 and less.

FIG. 2 shows a single-sided adhesive film 1 that is the same as in FIG. 1, except that a release film 5 is arranged on the side of the adhesive layer facing away from the backing layer 2. By means of the release film 5, the single-sided adhesive film 1 can be rolled up and then stored or transported. In order to firmly attach the single-sided adhesive film 1 to an application surface such as e.g. a conveying surface of a piece good transportation system, it is only necessary to peel off the release film 5 and press the single-sided adhesive film onto the application surface.

For example, the release film 5 is a polypropylene film from the firm Infiana having a thickness of 100 μm. Alternatively, other commonly-used release liners can be used as the release film.

If applicable, all of the individual features presented in the individual examples may be combined and/or exchanged with one another without departing from the scope of the invention.

LIST OF REFERENCE NOS

1 Adhesive film
2 Backing layer
3 Adhesive layer
4 Slip coating
5 Release film

The invention claimed is:

1. A method for producing a single-sided adhesive film, comprising:
   providing a backing layer, and
   coating a first side of the backing layer with an adhesive layer,
   wherein a slip coating is applied to a second side of the backing layer, and
   wherein the backing layer is provided in the form of a polyester film,
   characterized in that prior to bonding to the adhesive layer and the slip coating, the polyester film is treated with trichloroacetic acid, sodium persulfate, iron chloride or copper chloride in order to increase the surface energy of the polyester film,
   wherein the slip coating comprises polyurethane and is directly sprayed onto the second side of the backing layer so that the slip coating is planar.

2. The method as claimed in claim 1, characterized in that the slip coating hardens on the backing layer and is thus fixed to the backing layer.

3. The method as claimed in claim 1, characterized in that a release film is applied to the side of the adhesive layer facing away from the backing layer.

* * * * *